(12) United States Patent
El-Ashry et al.

(10) Patent No.: US 9,017,813 B2
(45) Date of Patent: Apr. 28, 2015

(54) DOPED CARBON NANOTUBES AND TRANSPARENT CONDUCTING FILMS CONTAINING THE SAME

(75) Inventors: Mostafa M. El-Ashry, Elmsford, NY (US); Ali Afzali-Ardakani, Ossining, NY (US); Bhupesh Chandra, White Plains, NY (US); George S. Tulevski, White Plains, NY (US)

(73) Assignees: International Business Machines Corporation, Armonk, NY (US); Egypt Nanotechnology Center, Cairo (EG)

( * ) Notice: Subject to any disclaimer, the term of this patent is extended or adjusted under 35 U.S.C. 154(b) by 229 days.

(21) Appl. No.: 13/552,077

(22) Filed: Jul. 18, 2012

(65) Prior Publication Data

US 2012/0282395 A1    Nov. 8, 2012

Related U.S. Application Data

(62) Division of application No. 12/873,427, filed on Sep. 1, 2010.

(51) Int. Cl.
| | |
|---|---|
| *B32B 9/00* | (2006.01) |
| *B82Y 30/00* | (2011.01) |
| *B82Y 40/00* | (2011.01) |
| *C03C 17/22* | (2006.01) |
| *H01B 1/24* | (2006.01) |

(52) U.S. Cl.
CPC ............ *B82Y 30/00* (2013.01); *B82Y 40/00* (2013.01); *C03C 17/22* (2013.01); *C03C 2217/28* (2013.01); *H01B 1/24* (2013.01); *Y10S 977/742* (2013.01)

(58) Field of Classification Search
USPC ........ 428/408; 423/447.1, 447.2, 448, 445 R; 252/500, 512; 977/742
See application file for complete search history.

(56) References Cited

U.S. PATENT DOCUMENTS

| | | | |
|---|---|---|---|
| 7,253,431 B2 | 8/2007 | Afzali-Ardakani et al. | |
| 7,511,344 B2 | 3/2009 | Bryant et al. | |
| 7,666,382 B2 | 2/2010 | Ghenciu et al. | |
| 2002/0081380 A1 | 6/2002 | Dillon et al. | |
| 2003/0122111 A1 | 7/2003 | Glatkowski | |
| 2006/0038179 A1 | 2/2006 | Afzali-Ardakani et al. | |
| 2006/0204427 A1 | 9/2006 | Ghenciu et al. | |
| 2006/0239891 A1 | 10/2006 | Niu et al. | |
| 2008/0001141 A1 | 1/2008 | Gruner et al. | |
| 2008/0093968 A1* | 4/2008 | Takai et al. ................... 313/311 |
| 2008/0191606 A1* | 8/2008 | Geohegan et al. ............ 313/501 |
| 2009/0179193 A1 | 7/2009 | Appenzeller et al. | |
| 2010/0051880 A1 | 3/2010 | Ghenciu et al. | |

OTHER PUBLICATIONS

Jiaping Wang; Removal of the Residual Surfactants in Transparent and Conductive Single-Walled Carbon Nanotube Films, J. Phys. Chem. C 2009, 113, 17685-17690.*

* cited by examiner

*Primary Examiner* — Daniel H Miller
(74) *Attorney, Agent, or Firm* — Cantor Colburn LLP; Vazken Alexanian

(57) ABSTRACT

Transparent conducting electrodes include a doped single walled carbon nanotube film and methods for forming the doped single walled carbon nanotube (SWCNT) by solution processing. The method generally includes depositing single walled carbon nanotubes dispersed in a solvent and a surfactant onto a substrate to form a single walled carbon nanotube film thereon; removing all of the surfactant from the carbon nanotube film; and exposing the single walled carbon nanotube film to a single electron oxidant in a solution such that one electron is transferred from the single walled carbon nanotubes to each molecule of the single electron oxidant.

10 Claims, 5 Drawing Sheets

DOPED CARBON NANOTUBES AND TRANSPARENT CONDUCTING FILMS CONTAINING THE SAME

CROSS REFERENCE TO RELATED APPLICATIONS

The present application is a Divisional application of U.S. patent application Ser. No. 12/873,427 filed on Sep. 1, 2010, incorporated by reference in its entirety.

BACKGROUND

The present invention relates to doped carbon nanotubes and more particularly, to transparent conductive films formed of the doped carbon nanotubes.

Transparent conducting electrodes are key components of many modern electronic devices including photovoltaic cells, organic light emitting diodes, flat panel displays and touch screens. The most widely used transparent conducting electrode is indium tin oxide (ITO). Despite the exceptional optoelectronic properties of ITO (e.g., sheet resistance of 5 to 10 ohms per square ($\Omega/\square$) at >85% transmittance), the material suffers from considerable drawbacks including increased materials cost due to scarcity of indium and the costs associated with high temperature vacuum deposition. Additionally, vacuum deposited ITO films are brittle and therefore not suitable for flexible electronics.

It turns out that very thin carbon nanotube films as thin as 10 or 20 nanometers are transparent to visible light and can conduct electricity, which makes them candidates for transparent conducting electrodes. Doping of the carbon nanotubes in films can increase overall conductivity. Currently, the most commonly used chemical dopants for nanotube networks are nitric acid and thionyl chloride. Although these materials provide excellent doping efficiency, these materials also have drawbacks. For example, both chemicals are relatively harsh chemicals and require special handling. Still further, the volatility of these materials leads to sheet resistances that are unstable over time and increases to values approaching those of undoped films.

To address these drawbacks, single electron oxidants have been developed, which can utilize milder solvents. These single electron oxidants dope the nanotubes by removing an electron from the carbon nanotube, presumably forming a stable charge transfer complex. However, these materials have exhibited low doping efficiency. For example, acid dopants have been found to provide 50% more doping efficiency than the prior art single electron oxidant dopants. Moreover, current single electron oxidant dopants do not exhibit good stability. Although the charge transfer complex should have resulted in greater stability, this has not been observed experimentally.

Accordingly, there is a need for alternative materials for use as transparent conducting electrodes, especially materials that avoid the use of nitric acid and thionyl chloride as chemical dopants, are non-volatile, and have a sheet resistance and an optical transmittance suitable for use as transparent conducting electrodes.

SUMMARY

Aspects of the invention include a method for doping a carbon nanotube and a transparent conducting electrode. The method comprises depositing single walled carbon nanotubes dispersed in a solvent and a surfactant onto a substrate to form a single walled carbon nanotube film thereon; removing all of the surfactant from the carbon nanotube film; and exposing the single walled carbon nanotube film to a single electron oxidant in a solution such that one electron is transferred from the single walled carbon nanotubes to each molecule of the single electron oxidant.

The transparent conducting electrode comprises a transparent substrate; and a doped single walled carbon nanotube film deposited thereon, wherein the doped single walled carbon nanotube film is free of surfactant and is doped by solution processed doping with a single electron oxidant, such that one electron is transferred from the carbon nanotube to each molecule of the single electron oxidant.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
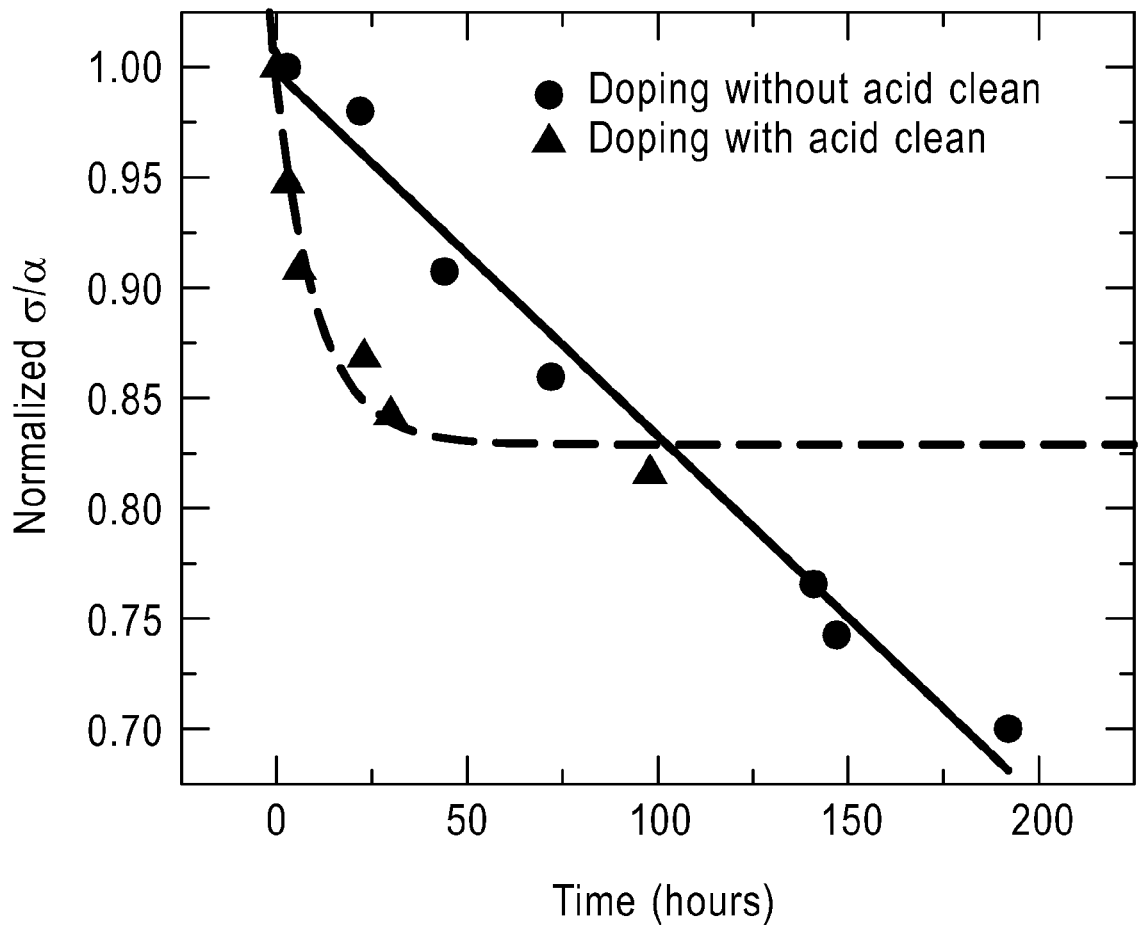
FIG. 1 graphically illustrates doping stability for single electron dopant with and without removal of surfactant prior to doping.

The detailed description explains the preferred embodiments of the invention, together with advantages and features, by way of example with reference to the drawings.

DETAILED DESCRIPTION

In one embodiment, the present invention relates to transparent conducting electrodes comprising a doped single walled carbon nanotube film and a method for forming the doped single walled carbon nanotube (SWCNT) by solution processing. The method generally includes removing surfactant from a deposited SWCNT film, solution doping the surfactant-free nanotube film with a single electron oxidant at an elevated temperature, and drying the film to form the SWCNT film. The single electron oxidant forms a stable charge-transfer complex with the SWCNTs, thereby injecting holes into the SWCNT film. Deposition of the nanotube film is not limited to any particular deposition method and generally involves the use of carbon nanotubes dispersed in a solvent and a surfactant, e.g., filtration, spray deposition, electrophoresis, drop-drying, direct growth, and the like. By removing the surfactant prior to solution doping, the resulting doped SWCNT films of the invention are stable over time and exhibit improved performance relative to acid doped films. Unlike prior art single electron transfer doped nanotubes, the charge transfer complex is stable and non-volatile.

In one embodiment, the surfactant in an as-deposited undoped SWCNT film is completely removed by exposing the film to an acid for an extended period of time. The surfactants are not intended to be limited. Several commercial surfactants, such as sodium dodecyl sulfate, sodium cholate, triphenyl derivatives, and sodium dodecylbenzene sulfonate have been demonstrated to efficiently disperse bundled single-walled carbon nanotubes into suspensions of individual nanotubes.

Suitable acids include, but are not limited to, sulfuric acid, hydrochloric acid, trifluoromethane sulfonic acid, methane sulfonic acid, and the like. The particular acid, acid strength and time are not intended to be limited. Transmission electron microscopy (TEM) can be employed to determine whether the surfactant has been completely removed. Residual surfactant, if present, can be observed as adhering to the nanotube bundles. Suitable acids include, without limitation, nitric acid, sulfuric acid, hydrochloric acid, trifluoromethane sulfonic acid, methane sulfonic acid, acetic acid and the like. By way of example, the undoped SWCNT can be exposed to 12 M nitric acid for one hour to effectively remove the surfactant. After exposure to the strong acid, the films are rinsed with water to remove the acid.

In another embodiment, the surfactant in an as-deposited undoped SWCNT film is completely removed by exposing the film to a base for an extended period of time. Suitable bases include, without limitation, sodium hydroxide, potassium hydroxide, ammonium hydroxide, and the like.

In yet another embodiment, the surfactant in an as-deposited undoped SWCNT film is completely removed by exposing the film to a gas at a temperature effective to react with the surfactant; and rinsing the single walled carbon nanotube film with deionized water. Suitable gases for the gas phase reaction include without limitation, oxygen, hydrogen, argon, and the like. During the gas phase reaction, the temperature is generally maintained within a range of about 80 to about 450° C.

In still other embodiment, the surfactant can be removed by exposure to an oxidant or a reductant that effectively reacts with the surfactant to render the surfactant rinse removable. Suitable oxidants include, without limitation, potassium permanganate, hydrogen peroxide, periodic acid, osmium tetroxide, and the like. Suitable reductants include, without limitation, hydrazine, phenylhydrazine, ammonia, and the like.

In still another embodiment, the surfactant is removed by organic solvents, not limited to, alcohols such as ethanol, methanol, and the like; halogenated organic solvents such as methylene chloride, chloroform, and the like; and polar aprotic solvents such as dimethyl formamide, n-methylpyrolidone, dimethyl sulfoxide, and the like.

Once the surfactant has been removed, the SWCNT film can then be introduced to a doping solution include a single-electron oxidant that can oxidize aromatic compounds of the single walled carbon nanotube. P-doping may be accomplished by the reaction of the single electron oxidant and aromatic compound on the carbon nanotube resulting in the formation of a charge transfer complex. The interaction of the carbon nanotube with the charge transfer complex results in the formation of a charged (radical cation) moiety on the carbon nanotube. In one embodiment, doping with the single electron oxidant is performed immediately after removal of the surfactant with the acid and subsequent rinsing. In other embodiments, the acid cleaned films are immersed in deionized water to avoid drying of acid residues. The acid cleaned films are then rinsed with an organic solvent such as acetone, dichloroethane, and the like and then dried. The dried acid cleaned films can then be doped in the same manner as discussed above.

Solution processed doping with the single electron oxidant is carried out in an organic solvent including, without limitation, dichloromethane, acetonitrile, chloroform and mixtures thereof. Examples of single electron oxidants useful in the solution processed doping of the invention include, without limitation, organic single electron oxidants, metal organic complexes pi-electron acceptors, and silver salts. Examples of organic single electron oxidants include antimony compounds such as trialkyloxonium hexachlroantimonate, antimony pentachloride, nitrosonium salts (for example triethyl oxonium tetrafluoroborate), tris-(pentafluorophenyl) borane and nitrosonium cation. Examples of metal organic complexes include tris-(2,2'-bipyridyl) cobalt (III) and tris-(2,2'-bipyridyl) ruthenium (II). Examples of pi electron acceptors include tetracyanoquinodimethane, benzoquinone, tetrachlorobenzoquinone, tetraflurobenzoquinone, tetracynaoethylene, tetrafluoro-tertracyanoquinodimethane, chloranil, tromanil and dichlorodicyanobenzoquinone. Examples of silver salts include silver fluoride, and silver trifluoroacetate. For organometallic dopants, common organic solvents like acetonitrile, tetrahydrofuran and aromatic hydrocarbons and chlorinated solvents like dichloromethane and chloroform are suitable. For inorganic salts like silver fluoride either alcohols or mixture of alcohols and water can be employed.

In one embodiment, triethyloxonium hexachloroantimonate ($C_2H_5$)$_3$O+SbCl6- can be used, e.g., with concentration range of about 1 to about 20 mM, and temperature range of about 10 to about 100° C., and one exemplary solvent is acetonitrile. In other embodiments, the temperature is about 30 to 100° C., and in still other embodiments, the temperature is about 70 to about 80° C. It is believed that the antimonite reacts as follows with the carbon nanotube. If 1 represents the benzene ring(s) on a carbon nanotube, then 2[1]+3[($C_2H_5$)3O+SbCl6-]→2[1+.SbCl6-]+3$C_2H_5$Cl+3($C_2H_5$)2O+SbCl3. The doped nanotubes are stable in ambient conditions. Any excess single electron oxidant on the nanotube is removed by rinsing the nanotube in the same or different organic solvent used in the doping process. Following rinsing, the film is dried under vacuum.

In one method of the invention, bulk doping is achieved by stirring a suspension of the nanotube in the organic solvent in the presence of the single electron oxidant in solution in the organic solvent. The rate of the reaction and the temperature are controlled to achieve a charge density of from about 0.01 to about 1 electron/nanometer of length of tube. Any excess single electron oxidant on the nanotube is removed by rinsing the nanotube in the same or different organic solvent used in the doping process. Following rinsing, the sample, e.g., the bulk nanotube is dried under vacuum.

The doped single walled carbon nanotube film can be deposited on a transparent substrate to form a transparent conducting electrode. The substrate can be glass or plastic, which may be rigid or flexible. In one embodiment, the thickness of the doped single walled carbon nanotube film is 0.001 microns to 1 microns and in other embodiments, the thickness is 0.01 microns to 0.2 microns and in still other embodiments, the thickness is 0.02 microns to 0.1 microns.

A figure of merit for any transparent conductor is given by the following equation:

$$\sigma/\alpha = -\{R_s \ln(T+R)\}^{-1},$$

Wherein $\sigma$ and $\alpha$ are the dc conductivity and optical adsorption coefficient, respectively. $R_s$ is the nanotube film sheet resistance, T is the film transparency, and R is the film reflectance. In one embodiment, the doped single walled carbon nanotube film has a $\sigma/\alpha$ ratio of greater than 0.01, and in other embodiments, the $\sigma/\alpha$ ratio is greater than 0.1. As for sheet resistance, in one embodiment the sheet resistance is less than 1000Ω/☐ to greater than zero, and in other embodiments, the sheet resistance is less than 100Ω/☐ to greater than zero.

Figure 2:
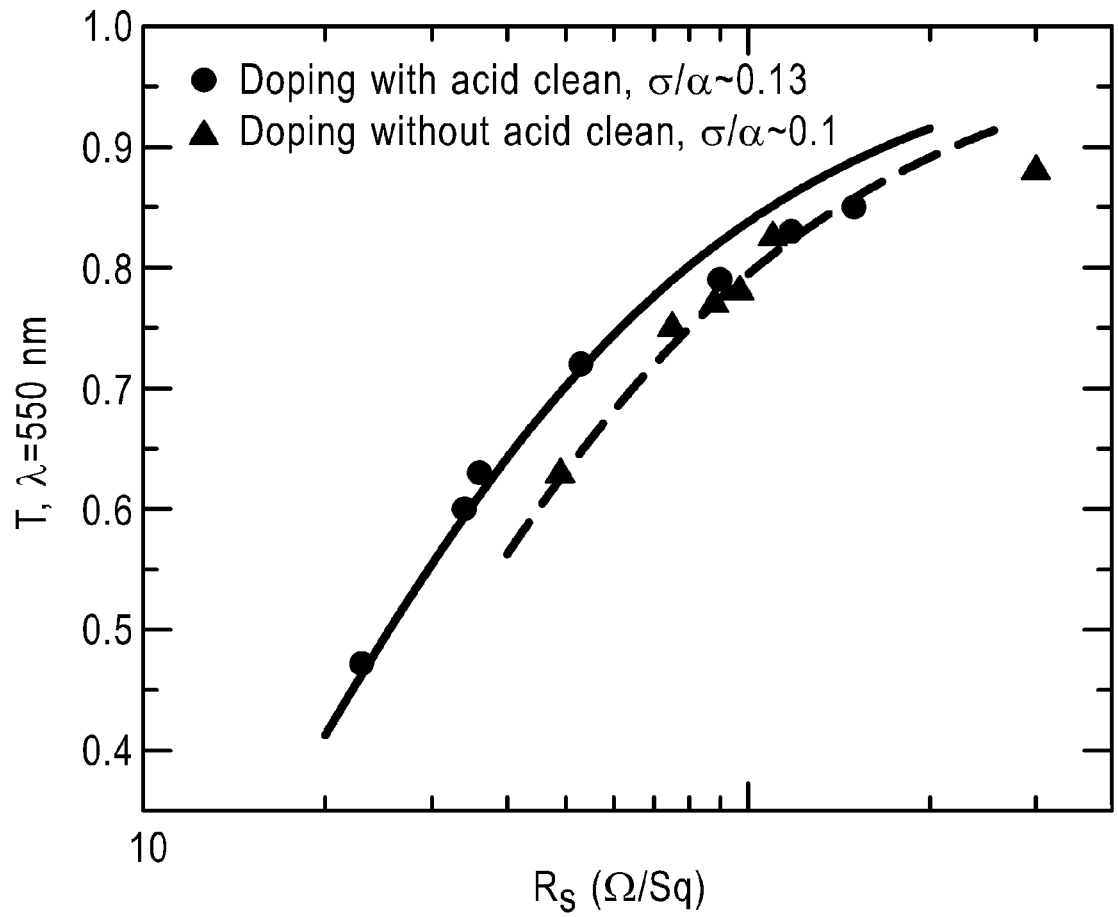
FIG. 2 graphically illustrates doping efficiency for single electron dopant with and without removal of surfactant prior to doping.

As discussed above, prior art single electron transfer doped nanotubes did not include removing the surfactant prior to doping. It has been discovered that removing the surfactant prior to doping with the single electron oxidant renders the charge transfer complex stable and non-volatile. FIG. 1 graphically illustrates the effect of removing sodium dodecylsulfate surfactant on doping stability, wherein the dopant was triethyloxonium hexachloroantimonate single electron dopant As shown, stability markedly increased as a function of time if the surfactant was removed prior to doping compared to not removing the surfactant. FIG. 2 graphically illustrates single electron dopant doping efficiency with and without removable of the surfactant, which was markedly increased by removing the surfactant compared to not removing the surfactant prior to doping.

The disclosure is further illustrated by the following non-limiting examples.

EXAMPLES

Example 1

In this example, doped SWCNT films were prepared and compared to undoped films. Arc discharged single walled carbon nanotubes (SWCNT) were purchased from Iijin Nanotech and subjected to step gradient centrifugation to yield a highly purified, concentrated solution of SWCNTs. Films were fabricated using vacuum filtration. The purified SWCNTs were first diluted (1:100 by volume) with 1% sodium dodecylsulfate surfactant and filtered through a mixed cellulose membrane (MF-Millipore Membrane, mixed cellulose esters, hydrophllic, 0.1 μm, 25 mm) to form a uniform SWCNT film. The volume of SWCNT solution determines the film thickness. The filtration speed was kept as low as possible to provide the highest degree of uniformity. The SWCNT films were then allowed to set for 15 to 20 minutes, followed by passing 50 milliliters of water through the membrane to wash off residual surfactant. The film was then air dried for 15 minutes.

A glass substrate was wetted with water and the membrane with the SWCNT down was pressed onto the wetted glass substrate. The membrane was then slowly dissolved in acetone to leave the nanotube film on the glass substrate.

Surfactant was then removed from the nanotube film by exposing the film to 12M nitric acid for 1 hour followed by rinsing with water. Transmission electron microscopy (TEM) was utilized before and after exposure to nitric acid to verify complete removal of surfactant.

The nanotube film was then doped with triethyloxonium hexachloroantimonate from Sigma Aldrich Company. The triethyloxonium hexachloroantimonate (100 mg) was dissolved in dichlorethane (chloroform, toluene, chlorobenzene, dichlorobenzene etc.) (10 ml) and the SWCNT films were soaked in the dopant solution for 1 hour at 70° C. The film was then rinsed with acetone to remove excess dopant molecules.

Figure 3:
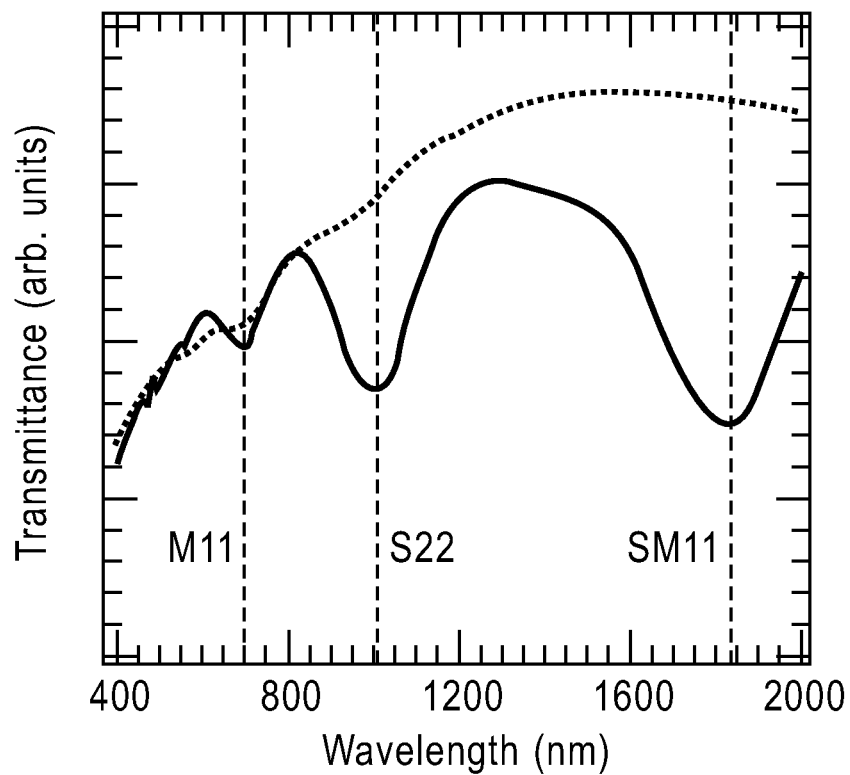
FIG. 3 graphically illustrates transmittance as a function of wavelength of an undoped single walled carbon nanotube film and a film doped with a single electron oxidant.

FIG. 3 graphically illustrates UV-VIS-NIR absorption spectra for both undoped and doped SWCNT films. The undoped films were vacuum annealed prior to the measurement to ensure the removal of unintentional dopants. The spectra revealed three main sets of adsorption bands that are attributed to the 1-D band structure of SWCNTs. The S11 adsorption peak corresponds to the first set of Van Hoves singularities above and below the band gap in semiconducting SWCNTs. Similarly, S22 and M11 peaks correspond to the second set of Van Hove singularities in semiconducting SWCNTs and the first set in metallic SWCNTs respectively. When the one electron oxidizing dopant reacts with the SWCNT, an electron is transferred from the SWCNT. The depletion of electrons from the valance band leads to an attenuation of the adsorption peaks and is strong evidence of charge-transfer doping. The spectra shows complete and near-complete attenuation of the S11 and S22 peaks of the semiconducting SWCNTs, respectively. As the electrons are depleted form the nanotube film, the hole carrier density increases, leading to effective p-type doping.

Figure 4:
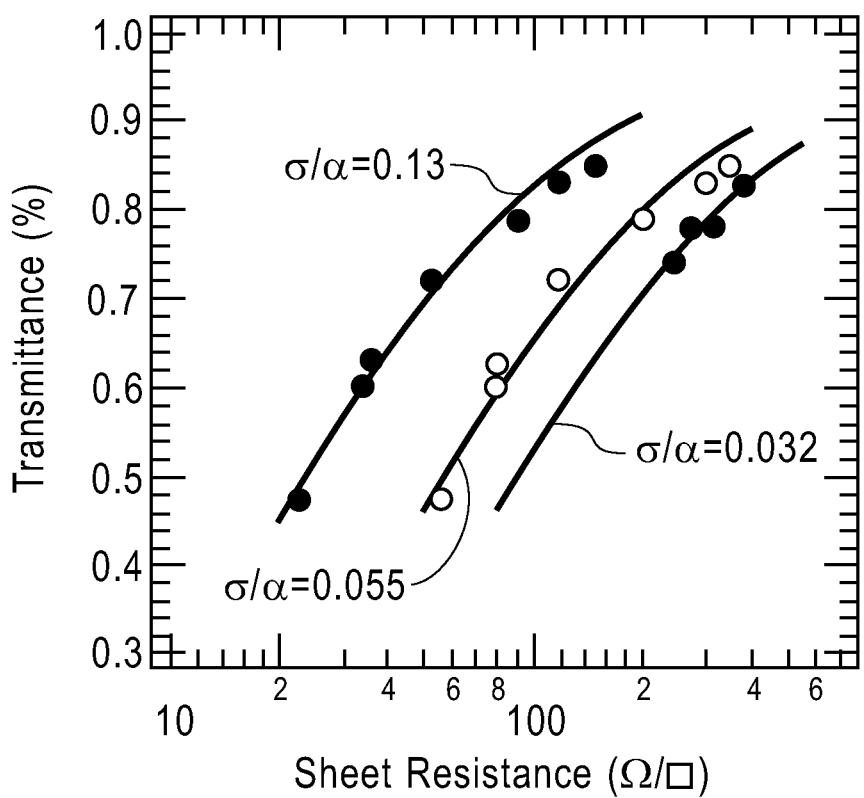
FIG. 4 graphically illustrates percent transmittance as a function of sheet resistance of an undoped single walled carbon nanotube (SWCNT) film, an as-prepared SWCNT film doped via exposure to ambient dopant, and a film doped with a single electron oxidant.

FIG. 4 graphically illustrates transmittance versus sheet resistance for undoped, as prepared, and doped SWCNTs. The sheet resistance was measured using a standard four point probe. The as-prepared films (i.e., unintentionally doped via exposure to ambient dopants in the air) had a $\sigma/\alpha$ of 0.055. The undoped films (i.e., vacuum annealed and then immediately measured) exhibited an $\sigma/\alpha$ ratio of 0.032. For the doped films, the $\sigma/\alpha$ was 0.13. This represents an increase by a factor of about 2.4 to 4 relative to the as-prepared and undoped vacuum annealed films, respectively. This increase in $\sigma/\alpha$ is comparable to increases observed with concentrated acid baths that are typically employed, i.e., nitric acid and thionyl chloride. These ratios correspond to films (with a % T of 75% at 550 nm) with an Rs of 246 ohms per square (Ω/☐) for the undoped film, 152Ω/☐ for the as-prepared film, and 63Ω/☐ for the one electron oxidant doped films.

Example 2

Figure 5:
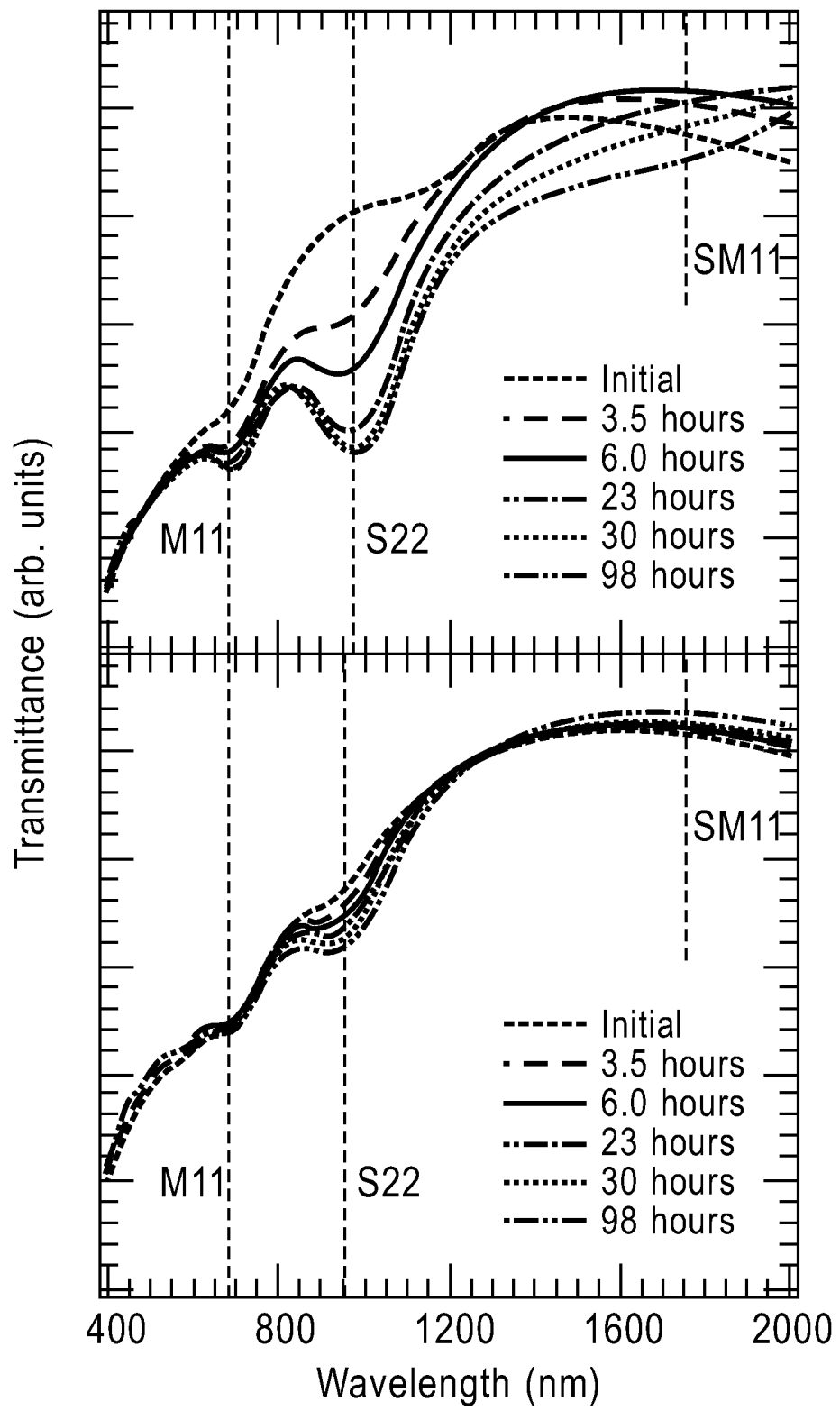
FIG. 5 graphically illustrates transmittance as a function of time for a prior art nitric acid doped SWCNT film, and a single electron oxidant doped SWCNT film prepared in accordance with the present invention, respectively.

In this example, stability of doped SWCNTs prepared with the single electron oxidant in accordance with Example 1 was compared to doped SWCNTs prepared with nitric acid. FIG. 5 graphically illustrates UV-VIS-NIR spectra taken at various times from immediately after doping to 98 hours after doping with nitric acid and the single electron oxidant, respectively. As shown, initially both films exhibited effective doping with both the S22 and S11 adsorption bands completely attenuated. However, as the nitric acid desorbs, the S22 transitions begin to regain their oscillator strength. As shown, the S22 peaks rapidly increase in intensity as a function of time. Similarly, the S11 transitions start to gain strength and continually increase through 98 hours after doping with nitric acid. The spectrum taken at 98 hours reveals an S22 region that has regained virtually all of the original strength and a small peak at the S11 region. These changes indicate a drastic reduction in the hole carrier density and a de-doping of the film.

In contrast, the single electron oxidant doped film was remarkably stable. The S22 region displays minimal change as a function of time. There was an initial small increase in the S22 peaks that was saturated over time. The S11 regions exhibit virtually no change after 98 hours of air exposure.

This data implies that he increased hole-carrier density in the single electron oxidant doped film was stable over time.

Figure 6:
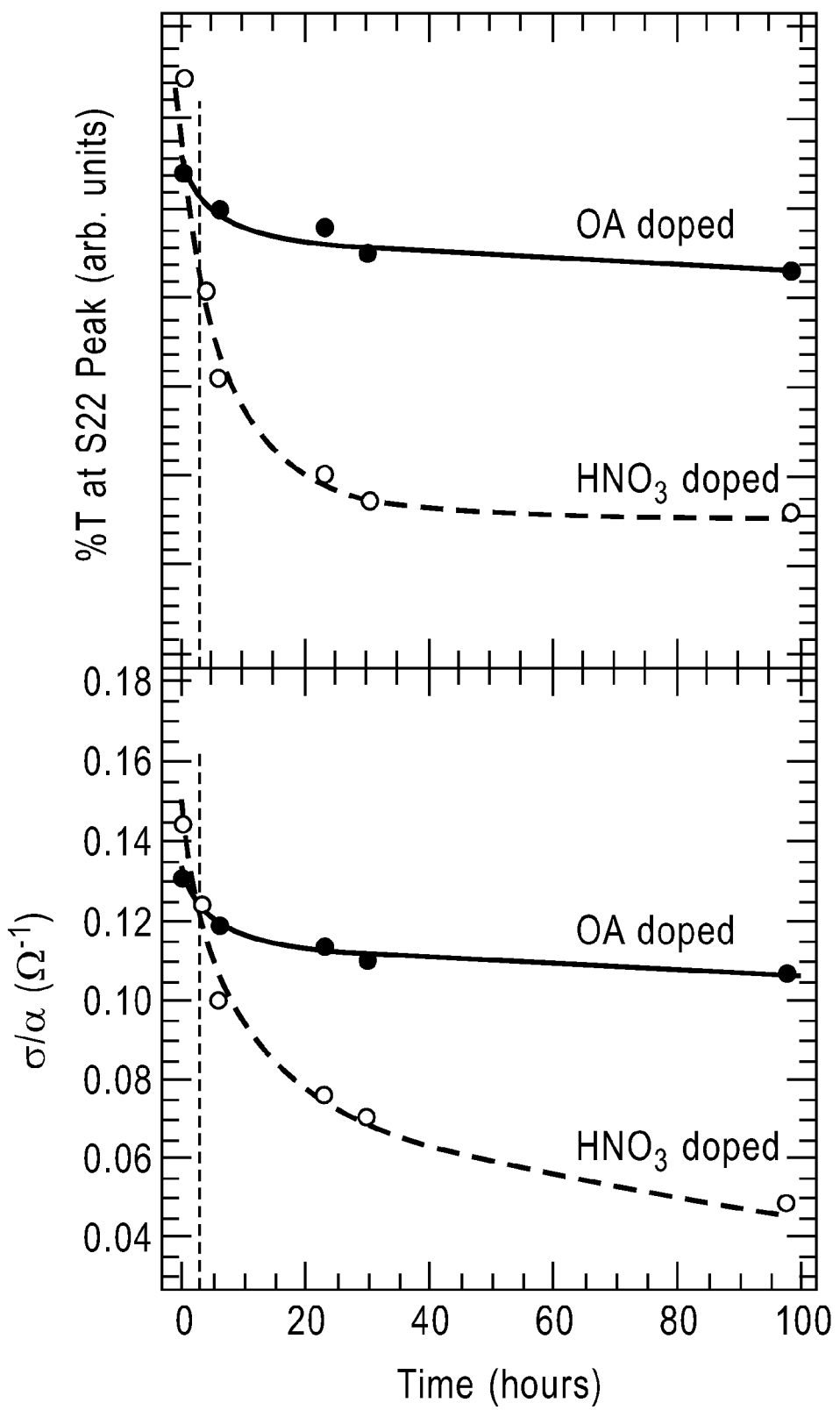
FIG. 6 graphically illustrates percent transmittance at the S22 peak for a single electron oxidant doped SWCNT film compared to a nitric acid doped SWCNT film; and the ratio of dc conductivity ($\alpha$) and optical adsorption coefficient ($\sigma$) as a function of time for a prior art nitric acid doped SWCNT film and a single electron oxidant doped SWCNT film prepared in accordance with the present invention.

FIG. 6 is a plot of transmittance as a function of time at the S22 peak for the nitric acid doped SWCNT films and the single electron oxidant doped SWCNT films, respectively. The data was extracted from the adsorption data of FIGS. 3 and 4. A decrease in transmittance represents an increase in the S22 peak height and therefore, d-doping of the film. Although only relative differences are considered here, the two films have comparable transparencies (% T of 56.3 and 60.7 at 550 nm for nitric acid and single electron oxidant doped films, respectively). The single electron doped films showed a slight drop during the first few hours followed by saturation in the peak height over time. In contrast the nitric acid doped film showed a large drop in the transmittance followed by saturation after 24 hours.

FIG. 6 is a plot of σ/α as a function of time for both the nitric acid doped film and the single electron oxidant doped film. Since the transparency at 550 nm does not change with time, the change in σ/α is extensively due to changes in the electrical conductivity. The change in σ/α for the single electron oxidant doped film is virtually identical to that shown in FIG. 6 showing a slight drop initially followed by saturation. Because of the similar behavior, the optical data has proven to be an excellent predictor of the electrical performance of the film. The change in σ/α for the nitric acid doped film also closely followed that observed optically in FIG. 6 but diverges at 24 hours. While the change in the S22 peak saturates, the conductivity continued to decrease in the nitric acid doped films. The S22 regained nearly all of the original oscillator strength. Although the S22 peak was saturated after 24 hours, the S111 peak begins to increase over time as the film continues to de-dope. The continual de-doping of the film results in σ/α decreasing for the duration of the study. After 98 hours post-doping, σ/α of the nitric acid doped film decreased to a value of 0.05 from 0.14, decreasing by a factor of 3. Referring back to FIG. 4, this value is comparable to that observed with the as prepared films that were doped as a function of exposure to ambient dopants in the air. In the case of the nitric acid doped films, the doping and gains in sheet resistance are no longer observed after a few days. In stark contrast, the σ/α of the single electron oxidant doped films decreased slightly, about 15%, reaching a value of 0.11. This value is still a factor of about 2 larger than that of the as prepared films and a factor of about 3 larger than that of the undoped films.

It should be noted that the structures as illustrated in the Figures of the present invention are not drawn to scale. Namely, the various structures are illustrated as exemplary examples. As such, the length, height and width of various structures as shown in the Figures should not be interpreted as a limitation in the present invention.

All ranges disclosed herein are inclusive of the endpoints, and the endpoints are combinable with each other.

All cited patents, patent applications, and other references are incorporated herein by reference in their entirety.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for doping a carbon nanotube film, the method comprising:
   depositing single walled carbon nanotubes dispersed in a solvent and a surfactant onto a substrate to form a single walled carbon nanotube film thereon;
   removing all of the surfactant from the carbon nanotube film, wherein removing all of the surfactant consists essentially of exposing the single walled carbon nanotube film to a gas at a temperature effective to react with the surfactant, and rinsing the single walled carbon nanotube film with deionized water to remove the reacted surfactant; and
   subsequently exposing the single walled carbon nanotube film to a single electron oxidant in a solution such that one electron is transferred from the single walled carbon nanotubes to each molecule of the single electron oxidant to form a doped carbon nanotube film.

2. The method of claim 1, wherein the concentration of the single electron oxidant is from about 0.01 mM to about 20 mM.

3. The method of claim 1, wherein the single electron oxidant is selected from at least one of: organic one electron oxidant, metal organic complex, pi-electron acceptor and silver salt.

4. The method of claim 3, wherein the organic single electron oxidant is selected from at least one of: trialkyloxonium hexachlroantimonate, antimony pentachloride, nitrosonium salt, triethyl oxonium tetrafluoroborate, tris-(pentafluorophenyl) borane and nitrosonium cation.

5. The method of claim 3, wherein the metal organic complex comprises at least one of tris-(2,2'-bipyridyl) cobalt (III) and tris-(2,2'-bipyridyl) ruthenium (II).

6. The method of claim 3, wherein the pi electron acceptor is selected from at least one of: tetracyanoquinodimethane, benzoquinone, tetrachlorobenzoquinone, tetraflurobenzoquinone, tetracynacethylene, tetrafluoro-tertracyanoquinodimethane, chloranil, bromanil and dichlorodicyanobenzoquinone.

7. The method of claim 3, wherein the silver salt is silver fluoride.

8. The method of claim 1, wherein exposing the single walled carbon nanotube film to the single electron oxidant in the solution is at a temperature of 10 to 100° C.

9. The method of claim 1, wherein exposing the single walled carbon nanotube film to the single electron oxidant in the solution is at a temperature of 70 to 80° C.

10. The method of claim 1, further comprising immersing the doped carbon nanotube film in deionized water subsequent to removing all of the surfactant from the carbon nanotube film and prior to exposing the single walled carbon nanotube film to the single electron oxidant in the solution.

* * * * *